United States Patent
Iotti

(10) Patent No.: US 11,724,575 B2
(45) Date of Patent: Aug. 15, 2023

(54) SELF-PROPELLED OPERATING MACHINE EQUIPPED WITH AN IMPROVED CABIN

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 148 days.

(21) Appl. No.: 17/109,721

(22) Filed: Dec. 2, 2020

(65) Prior Publication Data

US 2021/0170838 A1 Jun. 10, 2021

(30) Foreign Application Priority Data

Dec. 10, 2019 (IT) .......................... 102019000023532

(51) Int. Cl.
| | |
|---|---|
| *B60J 3/04* | (2006.01) |
| *B66F 9/075* | (2006.01) |
| *B62D 33/06* | (2006.01) |
| *B66F 9/065* | (2006.01) |

(52) U.S. Cl.
CPC ............. *B60J 3/04* (2013.01); *B66F 9/0759* (2013.01); *B62D 33/0617* (2013.01); *B66F 9/0655* (2013.01)

(58) Field of Classification Search
CPC ......... B60J 3/04; B60J 3/007; B62D 33/0621; B66F 9/0759; B66F 9/075
USPC ......................... 296/190.1, 96.19, 97.1, 97.2
See application file for complete search history.

(56) References Cited

U.S. PATENT DOCUMENTS

| | | | | |
|---|---|---|---|---|
| 7,245,205 | B2 * | 7/2007 | Strohband | B60J 3/04 |
| | | | | 428/38 |
| 8,814,256 | B2 * | 8/2014 | Uehara | B60J 3/04 |
| | | | | 296/214 |
| 9,365,161 | B2 * | 6/2016 | Mannheim Astete | B60J 3/04 |
| 2015/0367782 | A1 * | 12/2015 | Mannheim Astete | ...... |
| | | | | G02F 1/1333 |
| | | | | 349/12 |
| 2016/0052374 | A1 * | 2/2016 | Volbracht | B60J 3/04 |
| | | | | 296/190.1 |
| 2017/0182946 | A1 * | 6/2017 | Iotti | B61D 23/025 |
| 2018/0204538 | A1 * | 7/2018 | Reckamp | B60K 37/04 |
| 2021/0284024 | A1 * | 9/2021 | Ikegami | B60L 8/003 |

(Continued)

FOREIGN PATENT DOCUMENTS

| | | | |
|---|---|---|---|
| CN | 110370898 A | | 10/2019 |
| DE | 102015014647 A1 | * | 8/2017 |
| DE | 102019129399 A1 | * | 5/2021 |

(Continued)

OTHER PUBLICATIONS

Akihiro, Uchida; "Industrial Vehicle", JP 2016175424, Machine Translation, ip.com, Oct. 6, 2016 (Year: 2016).*

*Primary Examiner* — Jason S Morrow
*Assistant Examiner* — Wenwei Zhuo
(74) *Attorney, Agent, or Firm* — Pearne & Gordon LLP; J. Gregory Chrisman

(57) ABSTRACT

Described is a self-propelled operating machine (1) comprising a control cabin (2) for housing an operator and a unit (3) for moving a load. The control cabin (2) comprises a supporting frame (4) and a transparent wall (7) applied to the supporting frame (4) and partly delimiting the cabin (2). The transparent wall (7) can be made opaque in a controlled manner.

15 Claims, 3 Drawing Sheets

(56) References Cited

U.S. PATENT DOCUMENTS

2021/0379968 A1 * 12/2021 Do Rosario ............ H01B 5/14

FOREIGN PATENT DOCUMENTS

| DE | 102020118885 A1 | * | 1/2022 |
| EP | 0436283 A2 | * | 7/1991 |
| JP | 2003276436 A | * | 9/2003 |
| JP | 2003276436 A | | 9/2003 |
| JP | 2016175424 A | * | 10/2016 |
| JP | 2016175424 A | | 10/2016 |

* cited by examiner

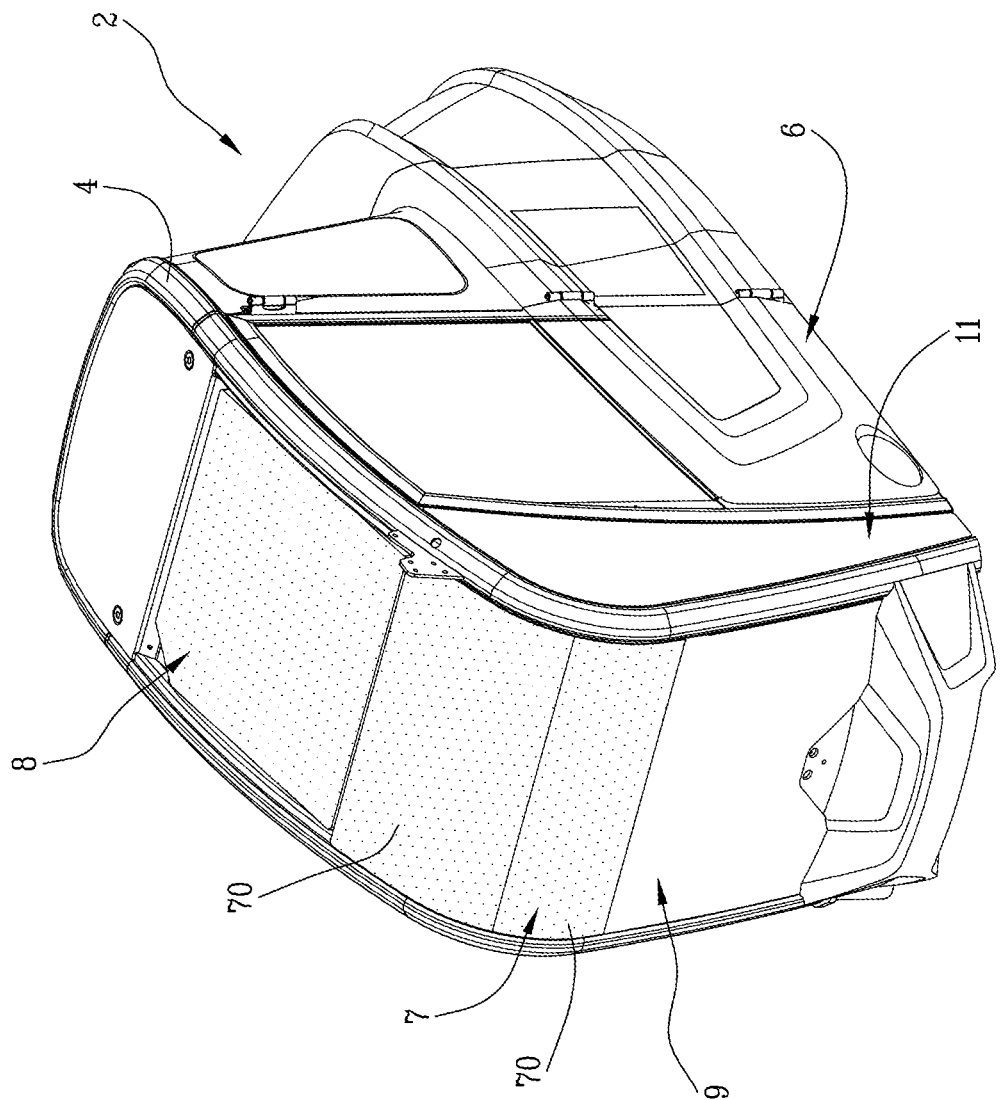

SELF-PROPELLED OPERATING MACHINE EQUIPPED WITH AN IMPROVED CABIN

This invention relates to a self-propelled operating machine, with reference in particular to a telehandler, equipped with an improved control cabin. There are prior art telescopic handlers ("telehandlers") consisting of a vehicle equipped with a movable frame on wheels, a driver's cab and an operating arm which can be extended telescopically.

At the distal end of the arm there is an apparatus for lifting and/or moving loads, such as, for example, a fork, a cage, a lateral transfer unit, a hoist, etc.

On the frame there is a control cabin designed to house the operator and comprising a control panel for controlling the movement of the machine and the actuation of the operating unit (or units).

Firstly, the cabin must meet safety and efficiency requirements linked mainly to visibility by the operator during both operation and movement of the machine.

During the movement of the operating units, the operator may be positioned facing the sun and thus operate in a very disadvantageous situation.

Even if the operator is adequately positioned against the sun, the light which penetrates through the transparent windows of the cab and reflected by the surfaces inside the cab can reduce the comfort for the operator.

Moreover, the sun's rays which continuously pass through the transparent windows of the cab determine in certain conditions a considerable increase in the temperature inside the cab, reducing the level of comfort for the operator and sometimes making it inaccessible.

Currently, in order to protect the operator from the sun's rays, the cabs mount internally, at the roof, a blind which can be operated manually and, at the windscreen, sunshade flaps which are not unlike those in use in automobiles.

These measures are inconvenient and require the operator to carry out a continuous and annoying manipulation, because they force the operator to find a compromise between visibility for work and protection from the sun which varies with changes in the operating steps and with changes in the brightness conditions during the day.

Moreover, disadvantageously these systems reduce the habitable volume of the control cabin and are subject to high wear which limits their effectiveness or requires frequent replacement.

In this context, the technical purpose which forms the basis of the invention is to provide a self-propelled operating machine which overcomes the above-mentioned drawbacks of the prior art.

The technical purpose indicated and the aims specified are substantially achieved by a self-propelled operating machine according to claim 1.

Further features and advantages of this invention are more apparent in the detailed description below, with reference to a preferred, non-limiting embodiment of a self-propelled operating machine as illustrated in the accompanying drawings, in which:

FIG. 2 is a perspective view of a portion of the self-propelled operating machine of FIG. 1;

Figure 1:
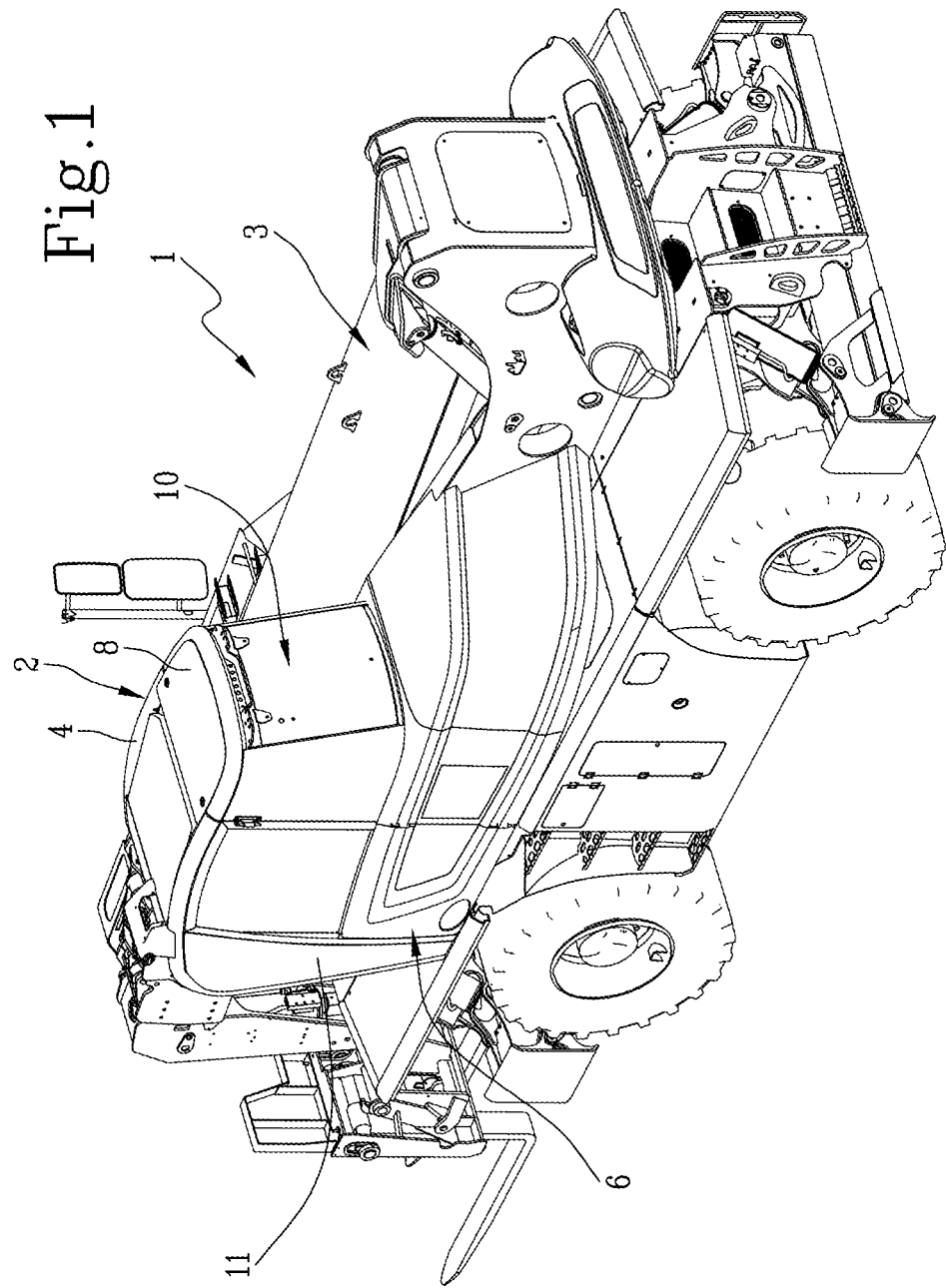
FIG. 1 is a perspective view of a self-propelled operating machine according to a possible embodiment of the invention.

FIGS. 3a-3i schematically illustrate a plurality of possible embodiments of a portion of the self-propelled operating machine of FIG. 1.

With reference to the accompanying drawings, the numeral 1 denotes in its entirety a self-propelled operating machine made according to the invention.

Preferably, the machine according to the invention consists of a telehandler 1, both fixed, rotary and articulated.

The operating machine 1 comprises at least one control cabin 2 and a telescopic operating arm 3 at the distal end of which is removably coupled an apparatus for lifting and moving a load.

The cabin 2 comprises a mounting frame 4 designed to delimit a cab 5 for the operator.

The control cabin 2 comprises a door 6 giving access to the cab 5.

The control cabin 2 comprises at least one transparent wall 7 applied to the supporting frame 4 in such a way as to delimit the cab 5.

In particular, the transparent wall 7 is configured to give the operator a large visibility in such a way as to increase the safety in the movement of the loads during the operating steps.

According to a possible embodiment and as illustrated in the accompanying drawings, the control cabin 2 has at least one upper wall 8, which acts as a roof, and a front wall 9, which acts as a windscreen, which may form a continuous single glazing.

Figure 3A:
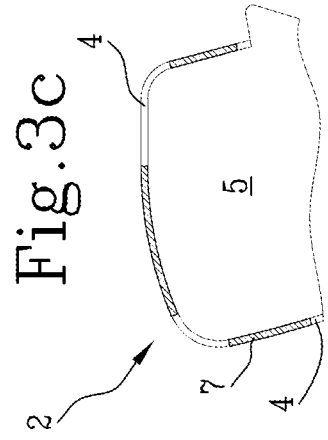
Figure 3B:
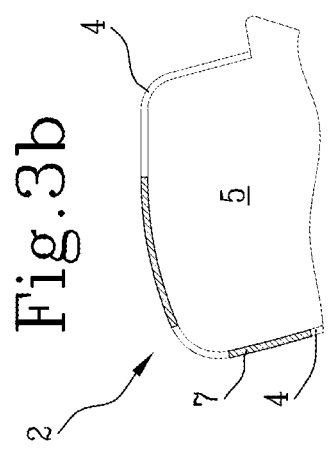
Figure 3C:
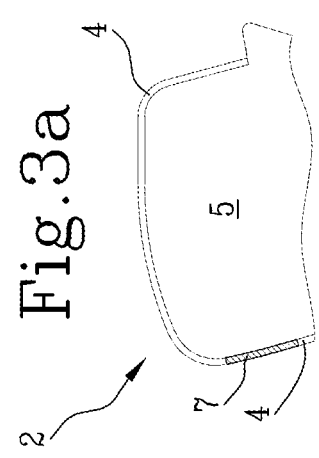
Figure 3D:
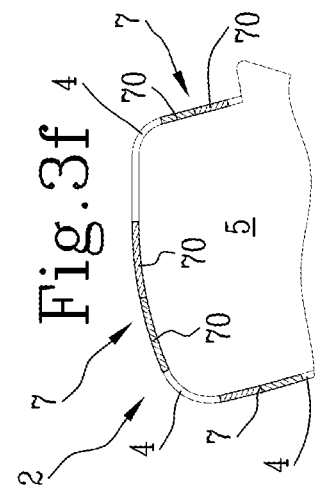
Figure 3E:
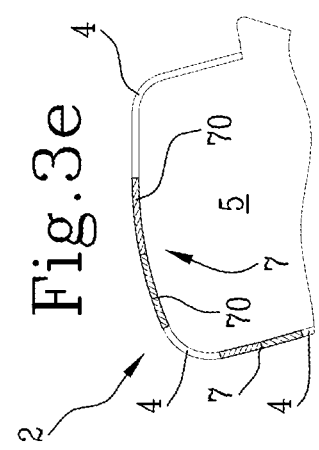
Figure 3F:
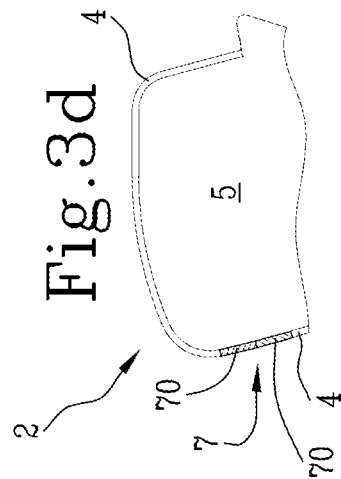
Figure 3G:
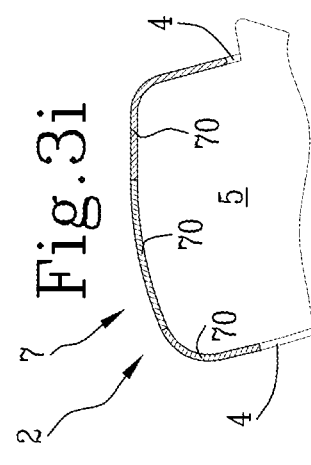

More generally speaking, the transparent wall 7 may be continuous and at least partly extend in the upper wall 8 and in the front wall 9 (as illustrated in FIG. 3g).

In accordance with that embodiment, the control cabin 2 guarantees the operator a continuous view of the load being moved, for example during a movement along a vertical direction, preventing structural elements, for example portions of the supporting frame 4 joining the front wall 9 and the upper wall 8, from being interposed between the operator and the load.

The control cabin 2 may also have a rear wall 10 and/or at least one side wall 11 operatively connected to form the cab 5 for the operator.

In practice, the control cabin 2 may comprise a plurality of transparent walls 7 applied to the supporting frame 4 and delimiting the cab 5 for the operator.

The transparent wall 7 may be made of composite glass (or layered glass) configured to guarantee a high level of safety inside the cabin 5 during the operating steps of the operating machine 1.

According to an important aspect of the invention, the transparent wall 7 of the control cabin 2 can be made opaque in a controlled fashion.

In other words, the control cabin 2 comprises at least one transparent wall 7 whose opaqueness is adjustable in order to define a plurality of different operating conditions inside the cab 5.

In this way it is possible to limit the brightness level inside the cab 5 reducing the risk of glare and, therefore, increasing the comfort for the operator during the operating steps of the operating machine 1.

Moreover, the transparent walls 7 which can be made opaque allow the luminosity inside the control cabin to be limited, guaranteeing at the same time a complete view of the operating unit for the operator.

In other words, the transparent walls 7 which can be made opaque reduce the brightness inside the control cabin without the need to interpose external elements which would reduce the view of the operator.

According to a possible embodiment, the transparent wall 7 houses internally a plurality of electrically reactive elements. The electrically reactive elements are configured to define an opaqueness of the transparent wall 7 following electrical energising exerted by a power supply unit (not illustrated in the accompanying drawings).

In particular, the transparent wall 7 may comprise a central layer interposed between a first and a second outer layer.

The first and second outer layers are configured to house the above-mentioned plurality of electrically reactive elements.

Advantageously, the at least one transparent wall 7 which can be made opaque may be positioned on the front wall 9 and/or on the upper wall 8. In that way, the transparent wall 7 guarantees that the operator has continuous protection against the risk of glare caused by sunlight when the operating unit 3 is moved.

According to a possible embodiment and as illustrated in FIGS. 3*a*, 3*b*, 3*c*, the control cabin 2 may comprise one or more transparent walls 7 which are separate from each other and can be made opaque in a selective fashion.

Moreover, the control cabin 2 may comprise at least one transparent wall 7 divided into a plurality of transparent portions 70 which can be made opaque in a selective fashion (FIGS. 3*d*, 3*e*, 3*f*).

In other words, the transparent wall 7 may have a plurality of portions 70 which can be made opaque independently of each other in such a way as to obtain a sectorial opaqueness of the transparent wall 7.

Figure 3H:
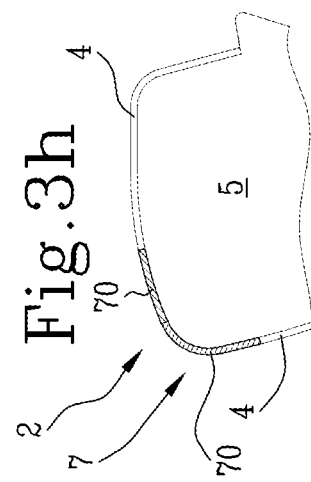
Figure 3I:
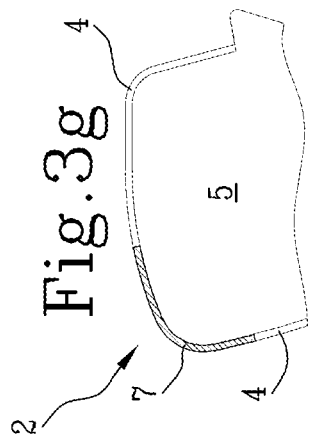

According to further possible embodiments and as illustrated in FIGS. 3*h*, 3*i*, the control cabin 2 may have one or more transparent walls 7 which are separate from each other at least one of which is divided into a plurality of transparent portions 70 which can be made opaque in a selective fashion.

Advantageously, the transparent walls 7 and/or the transparent portions 70 which can be made opaque in a selective fashion can be positioned in succession from the front wall 9 towards the upper wall 8 to guarantee a high level of customisation of the operating conditions inside the cab 5.

According to a particular embodiment, the operating machine 1 comprises a control unit (not illustrated in the accompanying drawings) configured for detecting and/or receiving at least one operating parameter of the operating machine 1.

In particular, the control unit is configured to act on the transparent wall 7 in such a way as to modify the degree of opaqueness, or also for modifying that of the transparent portions 70, as a function of the operating parameter detected and/or received.

Advantageously, the above-mentioned operating parameter may comprise information correlated with the positioning of the load positioned on the movement unit 3.

Moreover, the control unit may be configured to detect and/or receive information relating to the positioning of the sun.

In this way, the control unit can modify the degree of opaqueness of the transparent wall 7 and/or of the transparent portions 70 to guarantee a high visibility for the operator, reducing the probability of glare.

The operating machine 1 may comprise activation means (not illustrated in the accompanying drawings) which can be operated by the operator for activating and/or deactivating an opaqueness of the transparent wall 7 and/or of the transparent portions 70.

Moreover, the operating machine 1 may comprise adjustment means (not illustrated in the accompanying drawings) configured for setting up and/or varying a level of opaqueness of the transparent wall 7 and/or of the transparent portions 70.

In other words, the adjustment means make it possible to modify the degree of opaqueness of the transparent wall 7 and/or of the transparent portions 70 in such a way as to create a plurality of operating conditions inside the cab 5 designed to improve visibility and thus the comfort of the operator during the operating steps.

In particular, the adjustment means may define an adjustment of the opaqueness of the transparent wall 7 and/or of the transparent portions 70 according to a plurality of different and preset levels of opacity.

Moreover, the adjustment means can also provide continuous adjustment of the opaqueness of the transparent wall 7 and of the transparent portions 70.

Preferably, the adjustment means can allow an adjustment according to a plurality of different and preset levels of opacity and, alternatively, according to a continuous adjustment of the percentage of opacity.

According to some possible embodiments, the activation and/or the adjustment means are operatively connected to the control unit in such a way as to allow both an autonomous and manual activation and/or adjustment of the opaqueness of the transparent wall 7 and/or of the transparent portions 70.

It should be noted, therefore, that the invention achieves the preset aims by providing a self-propelled operating machine having a control cabin which is able to increase the safety during the operations for moving loads and/or during the movement of the self-propelled operating machine thanks to the presence of at least one transparent wall which can be made opaque in a controlled fashion which improves the conditions of visibility and limits the risk of glare for the operator.

In this way, moreover, the self-propelled operating machine contributes to increasing the comfort for the operator during the operating steps.

Moreover, advantageously, the large transparent walls of the control cabin guarantee a continuous view of the load being moved by the operator, limiting the possibility that structural elements, for example portions of the supporting frame, are interposed between the operator and the load.

Advantageously, the transparent walls and/or the transparent portions which can be made opaque in a selective fashion guarantee a high level of customisation of the conditions of visibility inside the cabin.

Moreover, advantageously, the above-mentioned opaque walls and/or portions limit the entrance of the sun's rays which, for example during the summer, determine a considerable increase in the temperature inside the cab.

The invention claimed is:

1. A self-propelled operating machine (1), said self-propelled operating machine (1) being a telehandler, said telehandler comprising a control cabin (2) for housing an operator and a first unit (3) for moving a load, said first unit (3) comprising an operating arm which is telescopically extendable, wherein said control cabin (2) comprises a supporting frame (4) and a first transparent wall (7) applied to said supporting frame (4) and delimiting at least partly the control cabin (2), wherein said control cabin (2) has an upper wall (8) and a front wall (9), the first transparent wall (7) being located at least partly on said front wall (9), said telehandler being configured and arranged so that the first transparent wall (7) can be made opaque in a controlled fashion, wherein the front wall (9) and the upper wall (8) form a continuous single glazing, wherein said first transparent wall (7) is divided into first and second transparent portions (70) which can be made independently opaque in a selective fashion, and wherein the first and second transparent portions are located on the front wall (9) and the upper wall, respectively, and the first and second transparent portions are disposed immediately adjacent one another.

2. The operating machine according to claim 1, comprising a second transparent wall (7) which is separate from said first transparent wall (7), wherein each of the first and second transparent walls (7) can be made opaque in a selective fashion.

3. The operating machine according to claim 2, wherein said first and second transparent walls (7) are positioned in succession from the front wall (9) towards said upper wall (8).

4. The operating machine according to claim 2, wherein the second transparent wall (7) is also divided into first and second transparent portions (70) which can be made opaque in a selective fashion.

5. The operating machine according to claim 1, comprising activation means which can be operated by the operator for activating and/or deactivating the making opaque of the first transparent wall (7).

6. The operating machine according to claim 1, comprising a control unit configured for detecting and/or receiving an operating parameter of the self-propelled operating machine (1) and for acting on the first transparent wall (7) for modifying a degree of opaqueness as a function of said operating parameter detected and/or received.

7. The operating machine according to claim 1, comprising adjusting means configured for setting up and/or varying a level of opaqueness of the first transparent wall (7).

8. The operating machine according to claim 1, wherein the first transparent wall (7) is made of composite glass.

9. The operating machine according to claim 1, wherein the first transparent wall (7) houses internally a plurality of electrically reactive elements, said electrically reactive elements being configured to define an opaqueness of the first transparent wall (7) following electrical energising applied by a power supply unit.

10. The operating machine according to claim 9, wherein the first transparent wall (7) comprises a central layer interposed between a first outer layer and a second outer layer, the first outer layer and the second outer layer housing said plurality of electrically reactive elements.

11. The operating machine according to claim 4, wherein said first and second transparent walls (7) are positioned in succession from the front wall (9) towards said upper wall (8).

12. The operating machine according to claim 1, wherein a distal end of the operating arm is provided with a first apparatus for lifting and/or moving a load, said first apparatus being selected from the group consisting of a fork, a cage, a lateral transfer unit, and a hoist.

13. The operating machine according to claim 1, wherein the first transparent wall (7) is continuous and at least partly extends in the front wall (9) and in the upper wall (8).

14. The operating machine according to claim 1, wherein the first transparent wall (7) is made of layered glass.

15. The operating machine according to claim 1, wherein said control cabin (2) has a rear wall (10), said telehandler further comprising a second transparent wall (7), said second transparent wall (7) being located at least partly on said rear wall (10), said telehandler being configured and arranged so that the second transparent wall (7) can be made opaque in a controlled fashion.

\* \* \* \* \*